Nov. 29, 1960 C. S. WHITE 2,961,704
INJECTION MACHINE
Filed March 18, 1957 3 Sheets-Sheet 1
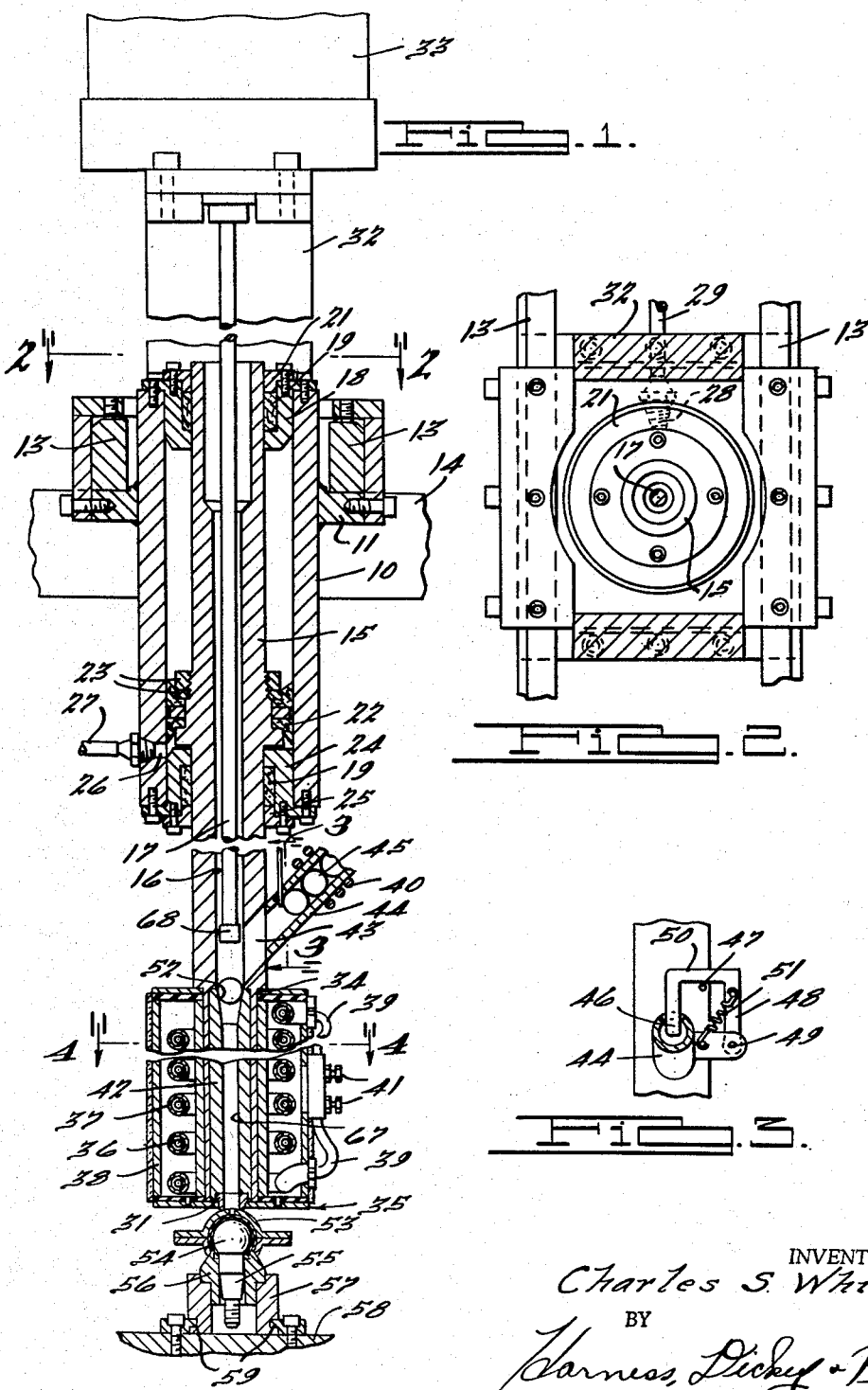
INVENTOR.
Charles S. White
BY
Harness, Dickey & Pierce
ATTORNEYS

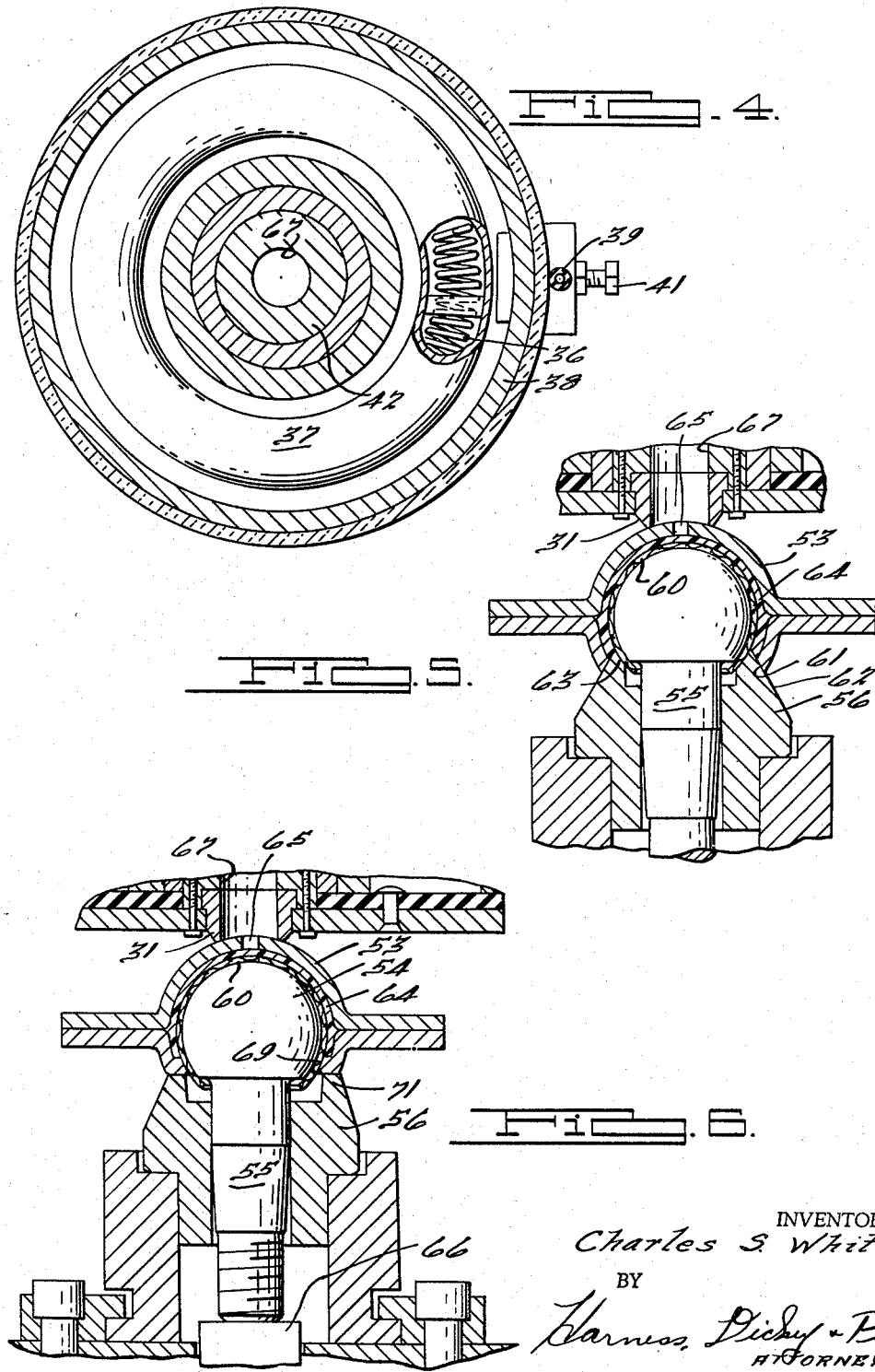

Nov. 29, 1960 C. S. WHITE 2,961,704
INJECTION MACHINE
Filed March 18, 1957 3 Sheets-Sheet 3
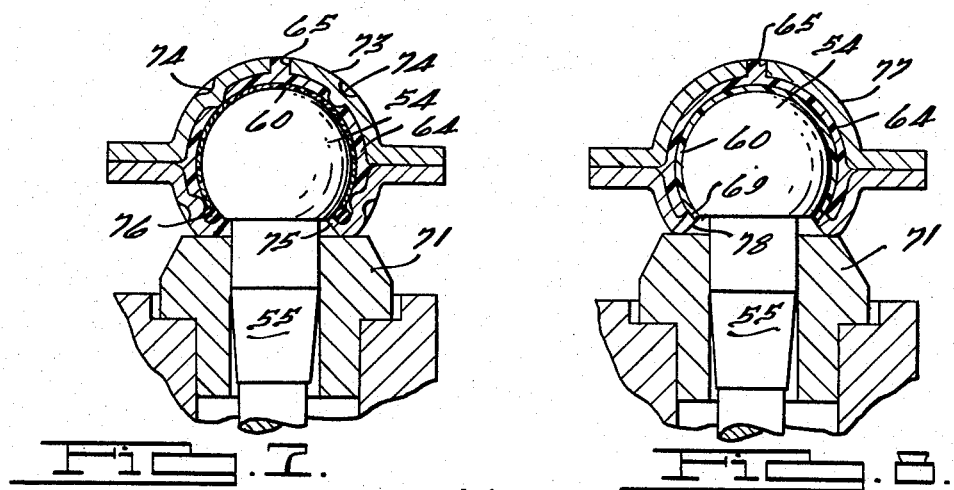
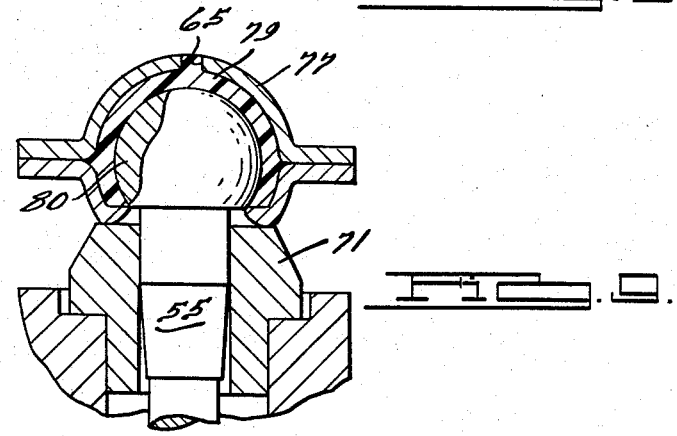
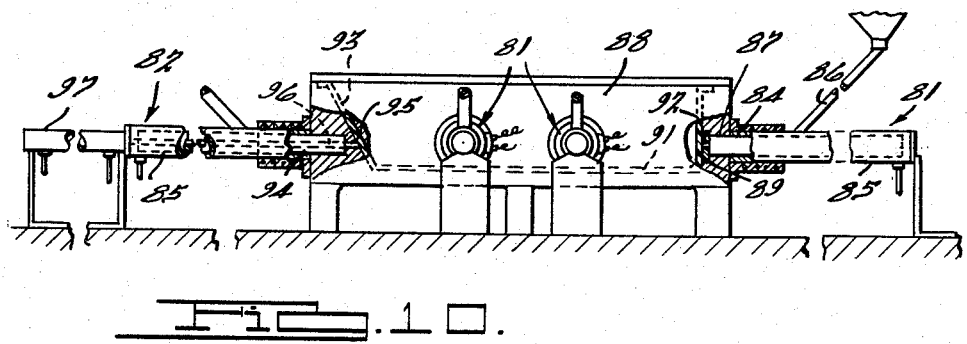
INVENTOR.
Charles S. White
BY
Harness, Dickey & Pierce
ATTORNEYS

United States Patent Office 2,961,704
Patented Nov. 29, 1960

2,961,704

INJECTION MACHINE

Charles S. White, Detroit, Mich.
(30007 Lahser Road, Birmingham, Mich.)

Filed Mar. 18, 1957, Ser. No. 646,851

9 Claims. (Cl. 18—30)

This invention pertains to a machine for injecting material into a confined space, and to a method of filling a confined space with material which is thereafter hardened.

Various types of sinterable or settable material may be employed. When plastic material is employed it is made up into pellet form with commutated particles embedded within the plastic mass. The mass may be heated to retain its pellet form but may be softened under heat and pressure when forced to flow through a small aperture. A woven tape of glass threads may be cut into small sections and mixed with a phenolic resin and slightly cured to maintain the pelletlike form. A pellet is injected into the bore of a piston rod having a sealing nozzle on its end. The rod portion is attached to a piston within a cylinder so that the nozzle may be advanced and retracted relative to the workpiece or the workpiece moved to engage the nozzle. A heating element may be provided about the lower portion of the piston rod adjacent to the nozzle and connected to a flexible conductor to permit the heating element to move upwardly and downwardly with the piston rod. A plunger is provided within the hollow piston rod to be actuated by a fluid operated ram which applies a substantial pressure on the plunger and the material in powder or pellet form. The pressure must be sufficient so that the plunger when acting upon a pellet of plastic material will cause the plastic material to flow through a small aperture into a cavity of an element, mold or the like. A downwardly sloping delivery tube is mounted on the machine to terminate at the side of the hollow piston rod for the purpose of delivering a pellet through an opening in the piston rod each time the tubular element is advanced.

For the purpose of illustration, a ball and socket joint is shown having a cavity about the ball into which the hardenable material is to be injected. The ball and socket joint illustrated herein by way of example, after assembly is placed upon an adapter, with the stud extending downwardly therethrough and mounted upon a carriage which is movable along gibs which accurately locate the assembly under the nozzle of the machine when the stud strikes a retractable stop element.

Accordingly, the main objects of the invention are: to provide a machine which extrudes plastic material under heat and pressure through a small aperture to fill a cavity; to provide a pellet of plastic material having short fine threads or particles therein that will flow through a small orifice when subject to a substantial pressure; to provide a machine which first seals the nozzle about a small aperture which leads to a cavity of a workpiece and then forces a hardenable material through the aperture into the cavity which is hardened after the cavity if filled; to provide a machine in which the plunger is retained in advanced position as the nozzle is retracted to clear the nozzle bore of any residue material, after which the plunger is also retracted; and, in general, to provide a machine which forces a material through an aperture into a cavity which is hardened and set after the flow ceases, all of which is simple in construction, positive in operation and economical to manufacture.

Other objects and features of novelty of the invention will be specifically pointed out or will become apparent when referring, for a better understanding of the invention, to the following description taken in conjunction with the accompanying drawings, wherein:

Figure 1 is a broken sectional view in elevation of a machine embodying features of the present invention;

Fig. 2 is a sectional view of the machine illustrated in Fig. 1, taken on the line 2—2 thereof;

Fig. 3 is a sectional view of the structure illustrated in Fig. 1, taken on the line 3—3 thereof;

Fig. 4 is an enlarged sectional view of the structure illustrated in Fig. 3, taken on the line 4—4 thereof;

Fig. 5 is an enlarged broken view of the structure illustrated in Fig. 1, showing one arrangement for sealing the cavity between the ball and socket;

Fig. 6 is a view of structure, similar to that illustrated in Fig. 5, showing another arrangement for sealing the cavity between the ball and socket;

Fig. 7 is a view of structure, similar to that illustrated in Fig. 6, showing another form of the invention;

Fig. 8 is a view of structure, similar to that illustrated in Fig. 7, showing still another form which the invention may assume;

Fig. 9 is a view of structure, similar to that illustrated in Fig. 8, showing another form of the invention, and Fig. 10 is a view in elevation of a die having a plurality of devices of the present invention installed thereon.

The machine of the present invention embodies a cylinder 10 having mounting blocks 11 at opposite sides near the top through which supporting bars 13 extend on which the cylinder may be adjusted. The bars 13 may be supported on bars 14 at right angles thereto so that the cylinder may be shifted along the bars 14 to any desired position. A piston rod 15 is mounted within the cylinder, the rod having a central passageway 16 for receiving a plunger 17 which is reciprocated therein. The top end of the cylinder contains a packing gland 18 having a packing material 19 which is compressed by an adjustable ring 21. A piston 22 is mounted on the piston rod 15 secured in position by the nuts 23. A packing gland 24 is mounted on the lower end of the cylinder 15 containing a packing material 19 which is sealed about the piston rod by an adjustable ring 25. Fluid is admitted through an aperture 26 in the lower part of the wall of the cylinder 10 from a conduit 27 into the area below the piston 22 which causes the piston, and therefore the piston rod, to be retracted or moved upwardly relative to the cylinder 10. An aperture 28 at the upper end of the cylinder 10 has the fluid delivered thereto through a conduit 29 for moving the piston, and therefore the piston rod, downwardly. A nozzle insert 31 on the end of the piston rod engages the top of the socket of a ball and socket assembly with a predetermined pressure, sufficient to assure a seal therewith. A pair of plates 32 extends upwardly from the cylinder 10 for supporting a cylinder 33 having a piston therein connected to the upper end of the plunger 17. Air or other fluid is admitted through conduits, not illustrated, at points above and below the piston at the upper and lower ends of the cylinder for moving the piston upwardly and downwardly within the cylinder 33 in a conventional manner.

The piston rod 15 has its outer diameter reduced at the working end to form a shoulder 34 against which a heating element 35 abuts when secured on the end of the rod. The heating element embodies a length of coiled wire 36 of the nickel-chrome or like resistance type mounted within a sheath 37 from which the coiled wire 36 is insulated in the conventional manner. The heating coil is mounted within a casing 38 and the ends 39 of the coil are secured to terminals 41 to which flexible conductors (not shown) are secured which permit the movement of the heater with the piston rod. A hardened insert 42 may be provided within the inner portion of the piston rod at the lower end thereof, having the insert 31 therein of Carboloy or other hard material, or the entire insert 42 may be made of the Carboloy or other hard material.

The piston rod has an aperture 43 in the side wall thereof disposed at an angle of substantially 45° which is in communication with a delivery tube 44 near the end of the downward stroke of the piston. A plurality of pellets 45 are fed from a hopper down in the delivery chute 44, the downward movement being interrupted by a finger 46 which extends within the chute as illustrated. A pin 47 on the piston rod strikes the horizontal portion 50 of the finger 46 to rock the vertical portion 48 on the pivot 49 against the bias of a spring 51, which raises the finger from the delivery chute 44 and thereby permits a pellet to drop down the chute against the wall of the piston. The downward movement interrupts the next adjacent pellet so that only the lowermost pellet will be delivered from the chute upon the initial downward movement of the piston through the aperture 43 therein. The heat from the piston rod will initially heat the pellet when engaged thereby and if not sufficient heat is provided a second heater 40 may be provided about the tube 44. The pellet drops downwardly in the aperture 16 of the piston rod and rests upon a tapered neck 52 in the piston rod 15 or the insert 42 near the top of the heater 35 where it will be initially or further heated.

The downward movement of the piston rod presses the insert 31 against the top of the socket 53 which is disposed about the ball 54 of the ball and socket joint. A stud 55 of the ball extends within an adapter 56 which is supported in the carriage 57 which moves along a table 58 guided in the ways 59. In the form illustrated in Fig. 5, the opening 61 in the socket 53 is of truncated conical shape to rest upon the conical surface 62 of the adapter 56 in substantially sealed relation thereto, with the socket spaced from the ball and with the truncated spherical recess 63 of the adapter in engagement with the material of the insert 64 which seals it with the ball 54. Shallow slots may be provided on the engaging edge of the insert or on the edge of the stamping 61 in engagement therewith to permit the escape of air ahead of the injected material. At the top of the socket 53, a small aperture 65 is provided which is disposed centrally of the insert 31, the insert having a sharp annular edge which cuts into and forms a seal with the socket. An element 66, illustrated in Fig. 6, may be employed to engage the stud with a predetermined pressure to prevent too great a force to be applied by the injected material to the ball which might otherwise shear the material of the cap 60. Pellet 45 is forced through the reduced bore 67 of the insert 42 by the plunger 17 which applies a high pressure to the material of the pellet after it strikes the top of the socket 53. The heat resulting from the high pressure and that of the heating means renders the material of the pellet flowable so that it will pass through the aperture 65 into the cavity between the ball and the inner surface of the socket 53. The flow is substantially instantaneous and the material immediately hardens when the flow stops at the time the cavity is filled. Thereafter, the piston rod 15 is retracted while the plunger 17 is retained in its downward position, to thereby cause any remaining material to be removed from the bore 67, after which the plunger is retracted. This retraction, as pointed out above, can immediately occur since the material has hardened to a degree which prevents it from flowing from the cavity and may require further curing by heat or time. The size of the pellet is selected to fill the cavity and the aperture 65 with a small amount of material left over so as to make sure that enough is available to completely fill the cavity which may vary in size. When the element, such as the socket 53, is engaged by the insert 31, the head 68 of the plunger 17 may be concaved to exactly mate with the spherical section of the socket so that substantially all of the material can be forced through the aperture 65.

As will be described hereafter, powdered metal may be employed alone or with powdered resin mixed therewith. When a resin is employed, a pellet 45 is made up of fine particles and a suitable resin, such as one of the phenolic types, with the particles made of any suitable material such as cotton, glass, synthetic fibers which are not affected by the heat and pressure. The fibers must be small enough and employed with sufficient plastic material so as to be capable of flowing through the small aperture 65. The pellets made of phenoformaldehyde and fine glass fibers cut to a length of approximately ⅛ to ½ inch have successfully been injected through an aperture 65 of a plate or the socket to fill the area of a cavity. When little movement occurs between the ball and socket, or when such movement only occurs when under light pressures, the resin may directly engage the ball to operate against the surface thereof while the irregular shape of the cavity prevents the set material from moving, as described more fully hereafter. However, if a low friction engagement is desired, an insert 64 is employed made of low friction threads woven into cloth form, and when made of Teflon or like nonbondable material, bondable cords are woven in the outer face so that a bond can be made to a backing fabric to which the resin material of the pellets 45 will bond. In such an arrangement, the insert 64 is bonded to the backing material of the pellet 45 which is preferably bonded to the inner surface of the socket 53 or which is physically retained against movement by a roughened or irregular surface provided thereon.

In Fig. 6, a further form of socket and adapter is illustrated, that wherein the bottom opening 69 is flanged inwardly to engage the ball 54 or the insert 64 when the latter is employed thereabout. The socket rests upon a flange 71 on the adapter and the ball will be forced downwardly thereagainst by the material of the pellet 45 which fills the area between the ball or the insert and the inner surface of the socket. Thus, the more pressure that is applied upon the material of the pellet 45, the tighter the ball will be forced downwardly against the flange of the bottom opening 69 of the socket and a more positive seal obtained. The space between the ball and socket is substantially filled instantaneously by the device and as fast as the piston rod can be retracted and advanced and the next carriage 57 moved to have the stud 55 of the next assembly strike a suitable stop element, the plastic material is applied about the ball within the socket. Upon each retraction of the piston rod, a pellet 45 is released by the finger 46 so that it may engage the wall of the piston adjacent to the slot 43, as illustrated in Fig. 1, and become initially heated, so that upon the initial downward movement of the piston rod, the ball will roll from the chute 44 into the aperture 46 and move downwardly to rest within the tapered neck portion 57 of the bore and be further heated. Further downward movement causes the insert 31 to seal about the opening 65 of the socket 53, whereupon the advancement of the head 69 of the plunger 17 forces the pellet through the heated bore 67 to raise the temperature of the material which is rendered flowable under the substantial applied pressure and fills the space between the ball or insert and the inner surface of the socket 53. The material immediately sets to an extent to prevent flow, permitting the piston rod 15 to be immediately retracted. This initial retraction occurs while the head 66 retains the material against the socket 53 so as to clear the bore 67 thereof, whereupon the plunger 17 is retracted. The seal of the ball with the socket is such as to permit the air in the cavity to escape but prevent the passage of the injected material.

In Fig. 7, a ball and socket device of the present invention is illustrated, wherein the flange 71 on the adapter 56 supports the socket 73. The ball is centered within the socket 73 by a plurality of nibs 74 pressed inwardly an amount to be disposed on a sphere struck from the center of the ball on a radius of the ball plus the thickness of the insert 64. The resin backing material 64 is then injected through the opening 65 in the space between the insert and the socket. Preferably the flange 75 directly engages the ball in a manner to provide approximately .010" clearance so that the air trapped in the cavity may escape ahead of the injected material while preventing the material from being ejected therefrom. An O-ring 76 may be provided adjacent to the flange 75 to assure a seal when the plastic material approaches the flange. The material will engage the O-ring and force it into sealing relation with the flange and the ball.

In Fig. 8, a similar arrangement is illustrated, that wherein a socket 77 has the flange 78 about the opening engage the bottom portion of the ball approximately at the end of the spherical portion thereof. The material 64 is inserted under pressure between the insert 60 and the inner surface of the socket 77.

In Fig. 9, an arrangement is illustrated, that wherein the insert 60 has been eliminated and a material 79 as a powdered or as a preformed pellet is injected into the area between the ball and socket. This material may be powdered metal which sinters at a low temperature, employed alone or which preferably has a low friction resin material in powder form mixed therewith. The material is in powder form and can be readily injected through the aperture 65 in the socket 77. Certain resin and plastic material, known in the art to be suitable, may be employed to fill the cavity between the ball and socket. Polyethylene moulding compounds, for example, may be employed, two being procurable on the market, one under the name of Super-dyland, the other under the name of Marlex. Phenolic impregnated glass fibrous material is procurable in the trade under the name of Durez, and a form of nylon material, procurable on the market under the name of Zytel, has also been employed. These materials will not produce the extreme low friction characteristics as the Teflon face of the inserts 60 but will produce a satisfactory low friction oilless joint which performs satisfactorily under minimum movement and reasonable load conditions. Preferably, the surface of the ball 54 is plated with nickel and a flash of chrome, as at 80, to rustproof the surface and improve the surface finish of the ball. A honing operation to true form provides a satisfactory surface for plating operation which produces a fine finish on the ball. With the rustproof finish on the ball, the seal normally employed between the ball and the inserted material is eliminated. The ball, being of true spherical form and molded directly within the material 78, provides complete area contact with the engaged surface of the injected material between which harmful materials could not collect.

The application of the machine to fill the space between the ball and socket with the plastic material is shown by way of example, and it is to be understood that the material may be applied in the same manner to fill any type of cavity. When the cavity is large, a plurality of the devices may be employed, actuated simultaneously, for inserting the plastic material therein. Thus, the material may be injected simultaneously from a plurality of devices 81 and 82 directly into a mold 88 to form objects as large as sinks, bathtubs, boats and the like. The size of the machines, the size and shape of the pellets, or the amount of powdered material, and the number of injection machines employed are selected in accordance to the size and shape of the cavity employed to produce the desired molded articles. The injection machines are simultaneously operated to have the material forced into the cavity in an amount to entirely fill the cavity while applying a uniform pressure to all of the material so that when the cavity is completely filled and no further flow will occur, the material will be set sufficiently so that the mold can be immediately opened and the molded article removed. It can therefore be seen that by the use of the pellet or powder type of plastic or sinterable material employing heat and substantial pressure, the material can be forced to flow through a small aperture to fill a cavity and harden sufficiently to retain its form when the flow ceases. This method eliminates the large number of molds employed heretofore because of the time required for the articles to remain therein while the material is being cured. The use of the pressure injected material within the cavity of the finally assembled element eliminates the large number of molds which would otherwise be required.

Referring again to the machine 81 of Fig. 10, it will be noted that the ram 84 of the machine is advanced forwardly by the piston in the cylinder 85 to inject a material which may be in powdered, pellet or other form from the tube 86 fed from a hopper under a suitable control. A plate 89 is releasably secured in the aperture 87 in the mold 88 adjacent to the cavity 91 to be filled. The plate has a hole 92 through which the material is injected and is secured in position by a bayonet type of joint. When the mold is opened and the molded article herein illustrated as a bathtub 93 is removed, the plate 89 is also removed and a new plate secured in position adjacent to the cavity so that the hole 92 in the removed plate may be cleaned of the material.

The machine 82 on the mold 88 has a cylinder 85 for advancing a plunger 94 to force a material through an aperture 95 in the mold into the cavity. The plunger 94 has a rod 96 extending therethrough connected to a piston within a ram 97, which plunger 94 reaches the end of its stroke and has forced all of the material ahead of it into the cavity and will move the rod 96 into the aperture 95 and force the material out of the end thereof. A pressure valve (not illustrated) connected to the cavity permits the escape of the excess material as the increased pressure produced by the small diameter rod forces the valve to open. In this manner, the material having the hole 92 therein may be a part of the mold that need not be removed at each operation. The construction and actuation of the two pistons in the cylinders 95 and 97 may follow that disclosed in the patent to Otto Mueller, No. 2,586,695, issued February 19, 1952.

What is claimed is:

1. In a machine for injecting a material into a cavity within an element, a hollow piston rod having an annular seat on one end thereof, a plunger slidably disposed within said hollow piston rod, said one end of the piston rod being large enough to enable the end of said plunger to move from a retracted position within the rod to a position wherein it projects completely through and beyond said one end, a ram for actuating said plunger between a retracted position within said piston rod and an advanced position near said one end, means for introducing a flowable material within the piston rod ahead of said plunger when in its retracted position, and actuating means for seating and unseating said annular seat against the element and around an aperture extending therethrough with a sufficient force to provide an annular seal about the aperture whereby when flowable material is introduced within the piston rod said ram can actuate said plunger to force the flowable material through the aperture in the element to fill the cavity, and when said actuating means unseats said one end of the piston rod from the element the piston rod and plunger can be moved relative to one another so as to project the plunger beyond said one end of the piston rod to completely remove all of the flowable material therefrom.

2. In a machine for injecting a material into a cavity within an element, a hollow piston rod having an annular seat on one end thereof, a plunger within said hollow piston rod and extendable to a position wherein the end thereof projects completely through and beyond said one end of the piston rod, a ram for actuating said plunger, delivery means for introducing a flowable material within the piston rod ahead of said plunger when in its retracted position, actuating means for clamping the seat on said one end of the piston rod in seating engagement with the element about an aperture therein communicating with said cavity, said ram advancing the plunger from its retracted position into abutting engagement with the element to force flowable material within the piston rod through said aperture and into said cavity, said ram and actuating means unclamping the piston rod from the element and retracting the plunger in a manner to project said plunger beyond said one end of the piston rod after it has been unclamped to completely remove all flowable material from the end of the piston rod.

3. In an injection machine, a pair of spaced rams, a telescoping sleeve and plunger each connected to one of said rams for movement relative to one another, said sleeve having an annular seat on one end thereof large enough to enable the end of said plunger to advance from a retracted position within said sleeve to an advanced position projecting beyond said one end of the sleeve, means for advancing the sleeve into engagement with an element about an aperture therethrough which communicates with a cavity therein, and means for advancing said plunger from its retracted position to a position adjacent to said one end of the sleeve to force a flowable material from the sleeve through said aperture and into said cavity, said rams retracting said sleeve relative to said plunger so that the end of the plunger projects from said one end of the sleeve to completely remove all of the flowable material from the sleeve.

4. In an injection machine, a pair of spaced rams, a telescoped sleeve and plunger each connected to one of said rams, said sleeve having an annular seat on one end thereof large enough to enable the end of said plunger to project completely therethrough, means for advancing said annular seat on the sleeve into engagement with an element about an aperture therethrough which communicates with a cavity therein to be filled, a plastic material in pellet form, means for advancing said plunger and forcing the material of the pellet through said aperture into the cavity of said element with sufficient force to cause the plastic material to soften and flow until the cavity is filled, whereupon the material becomes set, means for retracting said sleeve from engagement with said element so as to project the end of said plunger from said sleeve to completely remove all the plastic material from the sleeve, and means for retracting said plunger from the element to retract the end of the plunger back into the sleeve.

5. In an injection machine, a pair of spaced rams, a telescoped sleeve and plunger each connected to one of said rams, one end of said sleeve having an annular seat thereon large enough to enable the end of said plunger to be advanced from a position within said sleeve to a position projecting from and beyond the annular seat on said one end of the sleeve, means for advancing said annular seat on the sleeve into engagement with an element about an aperture therethrough which communicates with a cavity therein to be filled, a plastic material in pellet form, means for advancing said plunger to move the end thereof from its retracted position into engagement with the element to force the material of the pellet through said aperture into the cavity of said element with sufficient force to cause the plastic material to soften and flow until the cavity is filled when the material becomes set, means for retracting said sleeve from engagement with said element and relative to said plunger so that the end of the plunger projects from said one end of the sleeve to completely remove all the plastic material from the sleeve, means for retracting said plunger from the element thereafter, a delivery chute containing a series of pellets, and means actuated upon the upward movement of said sleeve for releasing a pellet from the chute.

6. In an injection machine, a pair of spaced rams, a telescoped sleeve and plunger each connected to one of said rams, one end of said sleeve having an annular seat thereon large enough to enable the end of the plunger to advance from a retracted position within the sleeve to a position wherein it projects beyond said one end of the sleeve, means for advancing said annular seat on the sleeve into engagement with an element about an aperture therethrough which communicates with a cavity therein to be filled, a plastic material in pellet form, means for advancing said plunger and forcing the material of the pellet through said aperture into the cavity of said element with sufficient force to cause the plastic material to soften and flow until the cavity is filled when the material becomes set, means for retracting said sleeve from engagement with said element and relative to said plunger so that the plunger projects therefrom to completely remove all the plastic material from the sleeve, means for retracting said plunger from the element thereafter, a delivery chute containing a series of pellets, means actuated upon the upward movement of said sleeve for releasing a pellet from the chute, and means for delivering said released pellet to the interior of said sleeve through an aperture in the wall thereof ahead of the plunger as the sleeve is moved down into engagement with the element.

7. In an injection machine, a pair of spaced rams, a telescoped sleeve and plunger each connected to one of said rams, one end of said sleeve having an annular seat thereon large enough to enable the end of said plunger to advance from a retracted position to a position wherein it projects beyond said one end of the sleeve means for advancing said annular seat on the sleeve into engagement with an element about an aperture therethrough which communicates with a cavity therein to be filled, a plastic material in pellet form, means for advancing said plunger and forcing the material of the pellet through said aperture into the cavity of said element with sufficient force to cause the plastic material to soften and flow until the cavity is filled when the material becomes set, means for retracting said sleeve from engagement with said element and relative to said plunger so that the plunger projects therefrom to completely remove all the plastic material from the sleeve, means for retracting said plunger from the element thereafter, a delivery chute containing a series of pellets, means actuated upon the upward movement of said sleeve for releasing a pellet from the chute, means for delivering said released pellet to the interior of said sleeve through an aperture in the wall thereof ahead of the plunger as the sleeve is moved down into engagement with the element, a heating element on said sleeve adjacent to the end which is advanced, and additional means aplying heat initially to said pellet prior to its delivery to said sleeve.

8. In a machine for injecting material into a cavity, a hollow cylindrical member having an annular seat on one end thereof, means for urging said member against an element to seat said one end about an aperture which communicates with a cavity within the element and retracting said member away from the element, a plunger within said member, means for moving said plunger relative to said member substantially into engagement with said element for applying pressure to a material contained therein sufficient to cause the material to soften and flow through said aperture to fill said cavity and retracting said plunger relative to said member, said material being of a type to flow under pressure and to set when the flow stops after the cavity is filled, said one end of the hollow cylindrical member being large enough to enable the end of said plunger to project completely therethrough whereby the hollow cylindrical member can be retracted relative to the plunger by means associated therewith so as to project the end of the plunger from said one end thereof.

9. In a machine for injecting flowable material into a cavity within an element, a sleeve having an annular seat on one end thereof adapted to seat against the element to provide an annular seal about an aperture in the element, a plunger within said sleeve and slidable between a retracted position and an advanced position wherein the end of the plunger projects through and beyond the seat on said one end of the sleeve, force applying means for clamping and unclamping the seat on said one end of the sleeve against said element, and means for actuating said plunger between its retracted and advanced positions to force the flowable material from the sleeve and through the aperture into the cavity and to completely scavenge all material from the sleeve when the plunger projects through and beyond the said one end of the sleeve.

References Cited in the file of this patent

UNITED STATES PATENTS

| | | |
|---|---|---|
| 1,997,074 | Novotny | Apr. 9, 1935 |
| 2,332,678 | Tucker | Oct. 26, 1943 |
| 2,413,401 | Youngblood et al. | Dec. 31, 1946 |
| 2,431,843 | Swoger | Dec. 2, 1947 |
| 2,790,995 | Heater | May 7, 1957 |